US006956085B2

(12) United States Patent
Grootaert et al.

(10) Patent No.: US 6,956,085 B2
(45) Date of Patent: Oct. 18, 2005

(54) FLUOROELASTOMER COMPOSITIONS

(75) Inventors: Werner M. A. Grootaert, Oakdale, MN (US); Eric W. Adair, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

(21) Appl. No.: 10/367,400

(22) Filed: Feb. 14, 2003

(65) Prior Publication Data

US 2004/0162395 A1 Aug. 19, 2004

(51) Int. Cl.[7] .................................................. C08F 8/34
(52) U.S. Cl. ..................... 525/374; 525/279; 525/326.2
(58) Field of Search ....................... 524/279; 525/326.2, 525/374

(56) References Cited

U.S. PATENT DOCUMENTS

| | | | | |
|---|---|---|---|---|
| 3,523,132 A | | 8/1970 | Dorfman et al. | |
| 3,546,186 A | | 12/1970 | Gladding et al. | |
| 3,686,143 A | | 8/1972 | Bowman | |
| 3,752,787 A | | 8/1973 | de Brunner | |
| 4,035,565 A | | 7/1977 | Apotheker et al. | |
| 4,259,463 A | | 3/1981 | Moggi et al. | |
| 4,281,092 A | | 7/1981 | Breazeale | |
| 4,287,320 A | | 9/1981 | Kolb | |
| 4,335,238 A | | 6/1982 | Moore et al. | |
| 4,394,489 A | * | 7/1983 | Aufdermarsh | 525/370 |
| 4,487,903 A | | 12/1984 | Tatemoto | |
| 4,525,539 A | | 6/1985 | Feiring | |
| 4,564,662 A | | 1/1986 | Albin | |
| 4,694,045 A | | 9/1987 | Moore | |
| 4,734,465 A | | 3/1988 | Moggi et al. | |
| 4,762,891 A | | 8/1988 | Albin et al. | |
| 4,882,390 A | | 11/1989 | Kolb | |
| 4,912,171 A | | 3/1990 | Grootaert et al. | |
| 4,948,853 A | | 8/1990 | Logothetis | |
| 4,972,038 A | | 11/1990 | Logothetis | |
| 4,983,680 A | | 1/1991 | Ojakaar | |
| 5,032,655 A | | 7/1991 | Moore | |
| 5,262,490 A | | 11/1993 | Kolb et al. | |
| 5,266,650 A | | 11/1993 | Guerra et al. | |
| 5,268,405 A | | 12/1993 | Ojakaar et al. | |
| 5,285,002 A | | 2/1994 | Grootaert | |
| 5,319,025 A | | 6/1994 | Weigelt | |
| 5,349,093 A | | 9/1994 | Oka et al. | |
| 5,378,782 A | | 1/1995 | Grootaert | |
| 5,451,625 A | | 9/1995 | Fukushi | |
| 5,488,142 A | | 1/1996 | Fall et al. | |
| 5,527,861 A | | 6/1996 | Logothetis | |
| 5,554,680 A | | 9/1996 | Ojakaar | |
| 5,565,512 A | | 10/1996 | Saito et al. | |

(Continued)

FOREIGN PATENT DOCUMENTS

| | | | |
|---|---|---|---|
| EP | 0 140 207 A2 | | 5/1985 |
| EP | 0 606 883 A1 | | 7/1994 |
| EP | 0 708 139 A1 | | 4/1996 |
| EP | 0 769 521 A1 | | 4/1997 |
| EP | 0 661 304 B1 | | 10/1997 |
| EP | 0 784 064 B1 | | 11/1999 |
| JP | 09 183879 A | | 7/1997 |
| JP | 2002-012705 | | 1/2002 |
| JP | 2002-114824 | | 4/2002 |
| WO | WO 90/14368 | | 11/1990 |
| WO | WO 98/23655 | | 6/1998 |
| WO | WO 99/48939 | | 9/1999 |
| WO | WO 00/09569 | | 2/2000 |
| WO | WO 00/09603 | | 2/2000 |
| WO | WO 01/02448 A1 | | 1/2001 |
| WO | WO 01/46116 | | 6/2001 |
| WO | WO-01/59005 A2 | * | 8/2001 |
| WO | WO 01/59005 A2 | | 8/2001 |
| WO | WO 02/48200 A2 | | 6/2002 |
| WO | WO 02/060969 A1 | | 8/2002 |
| WO | WO-2004/074363 A1 | * | 9/2004 |

OTHER PUBLICATIONS

U.S. Appl. No. 09/495,600, filed Feb. 1, 2000, Grootaert et al.

*Advanced Organic Chemistry Reactions, Mechanisms and Structures*, J. March, $2^{nd}$ ed., 1977, McGraw–Hill, Chapters 8 and 9.

Brown et al., "Reactions of Perfluoroalkyl Nitriles. V. Synthesis of Perfluoroacyl Imidates", *J. Org. Chem.*, vol. 30, (1965), pp. 3724–3728.

Yakubovich et al., "Syntheses in The 1,3,5–Triazine Series V. Iminoesters of Perfluorocarboxylic Acids–Syntheses, Properties, and Mechanism of Cyclopolymerization to 1,3, 5–Triazine Derivatives", pp. 878–885 (translated from *Zhurnal Obshchei Khimii*, vol. 36, No. 5, pp 863–871, May 1966).

Grinblat et al., "Infrared Investigation of The Vulcanization of Perfluoroalkylenetriazine Polymers", *Polymer Science U.S.S.R.*, vol. 21, 1980, pp. 1434–1441.

Paciorek et al., "Reactions Of Perfluoronitriles. I. Interactions With Aniline", *Journal Of Fluorine Chemistry*, 30 (1985), pp. 241–250.

*Primary Examiner*—Tatyana Zalukaeva
*Assistant Examiner*—Henry Hu
(74) *Attorney, Agent, or Firm*—Dean M. Harts

(57) ABSTRACT

Provided is a composition comprising a fluoropolymer comprising interpolymerized units derived from a nitrile cure site monomer, and an amino-substituted aromatic curative compound having at least one substituent other than hydrogen, wherein the net effect of the substituent(s) is not electron withdrawing, the curative has a pKa above about 12, the compound may contain one or more heteroatom(s) provided that no heteroatom directly bonded to a hydrogen is in the position ortho to the amino group, and one or more substituents may together form a ring, which ring may be aromatic and may include one or more heteroatoms(s). Also provided are the reaction products of the fluoropolymer and the curative described, cured articles, and a method of making the fluoropolymer compositions and articles.

18 Claims, No Drawings

U.S. PATENT DOCUMENTS

| | | | | |
|---|---|---|---|---|
| 5,585,449 | A | | 12/1996 | Arcella et al. |
| 5,591,804 | A | | 1/1997 | Coggio et al. |
| 5,621,145 | A | | 4/1997 | Saito et al. |
| 5,639,837 | A | | 6/1997 | Farnham et al. |
| 5,654,375 | A | | 8/1997 | Jing et al. |
| 5,677,389 | A | * | 10/1997 | Logothetis et al. ......... 525/340 |
| 5,681,881 | A | | 10/1997 | Jing et al. |
| 5,700,879 | A | | 12/1997 | Yamamoto et al. |
| 5,728,773 | A | | 3/1998 | Jing et al. |
| 5,733,981 | A | | 3/1998 | Coggio et al. |
| 5,756,588 | A | | 5/1998 | Kolb et al. |
| 5,767,204 | A | | 6/1998 | Iwa et al. |
| 5,789,489 | A | | 8/1998 | Coughlin et al. |
| 5,789,509 | A | | 8/1998 | Schmiegel |
| 5,877,264 | A | | 3/1999 | Logothetis et al. |
| 5,910,552 | A | | 6/1999 | Saito et al. |
| 6,077,609 | A | | 6/2000 | Blong et al. |
| 6,114,452 | A | | 9/2000 | Schmiegel |
| 6,191,208 | B1 | | 2/2001 | Takahashi |
| 6,203,912 | B1 | | 3/2001 | Watakabe et al. |
| 6,211,319 | B1 | | 4/2001 | Schmiegel |
| 6,281,296 | B1 | | 8/2001 | MacLachlan et al. |
| 6,346,300 | B1 | * | 2/2002 | Ruepping .................. 427/517 |
| 6,465,576 | B1 | * | 10/2002 | Grootaert et al. ........... 525/199 |
| 6,500,545 | B1 | * | 12/2002 | Ambrose et al. ........... 428/413 |
| 6,503,972 | B1 | | 1/2003 | Rai et al. |
| 6,518,366 | B1 | * | 2/2003 | Irie et al. ................. 525/326.2 |
| 6,638,999 | B2 | * | 10/2003 | Bish et al. .................. 524/195 |
| 6,803,425 | B2 | * | 10/2004 | Hintzer et al. ........... 525/326.2 |
| 2002/0026014 | A1 | | 2/2002 | Bish et al. |
| 2002/0055593 | A1 | | 5/2002 | Grootaert |
| 2002/0061977 | A1 | | 5/2002 | Grootaert et al. |
| 2002/0145228 | A1 | | 10/2002 | Kolb et al. |
| 2002/0177666 | A1 | | 11/2002 | Grootaert et al. |
| 2002/0183458 | A1 | | 12/2002 | Grootaert et al. |

* cited by examiner

FLUOROELASTOMER COMPOSITIONS

TECHNICAL FIELD

This invention relates to compositions of fluoropolymers having nitrogen-containing cure sites and amino substituted aromatic curative compounds, making and/or curing such compositions, and articles comprising such compositions.

BACKGROUND

Fluoropolymers are commercially useful materials. Fluoropolymers include, for example, crosslinked fluoroelastomers, and uncrosslinked fluoroelastomer gums. Certain fluoroelastomers are tolerant of high temperatures and harsh chemical environments, and thus are particularly useful as seals, gaskets, and other molded parts in systems that are exposed to elevated temperatures and/or harsh chemicals. Such parts are widely used in the automotive, chemical processing, semiconductor, aerospace, and petroleum industries, among others.

SUMMARY OF THE INVENTION

Briefly, the present invention provides a composition comprising a fluoropolymer comprising interpolymerized units derived from a nitrogen-containing cure site monomer, and an amino-substituted aromatic curative compound having at least one substituent other than hydrogen, wherein the net effect of the substituent(s) is not electron withdrawing, the curative has a pKa above about 12, the compound may contain one or more heteroatom(s) provided that no heteroatom directly bonded to a hydrogen is in the position ortho to the amino group, and one or more substituents may together form a ring, which ring may be aromatic and may include one or more heteroatoms(s).

In another aspect, the present invention provides a method of making a fluoropolymer composition comprising (a) providing a fluoropolymer comprising interpolymerized units derived from a nitrogen-containing cure site monomer, (b) providing an amino-substituted aromatic curative compound having at least one substituent other than hydrogen, said substituent(s) not including a heteroatom directly bonded to a hydrogen in the position ortho to the amino group, wherein the net effect of the substituent(s) is not electron withdrawing, the curative has a pKa above about 12, the compound may contain one or more heteroatoms(s), and one or more substituents may together form a ring, which ring may be aromatic and may include one or more heteroatoms(s), and blending the fluoropolymer with the curative.

The invention also provides articles containing the curable or cured compositions such as sheets, films, hoses, gaskets, seals, and O-rings. The invention is particularly desirable for articles with good physical properties and low compression set at high temperatures. The invention has high temperature resistance (better than aminophenol and peroxide systems) without scorch (premature curing) problems associated with ammonia-generating compounds.

Other features and advantages of the invention will be apparent from the following detailed description of the invention and the claims. The above summary of principles of the disclosure is not intended to describe each illustrated embodiment or every implementation of the present disclosure. The details that follow more particularly exemplify certain preferred embodiments utilizing the principles disclosed herein.

DETAILED DESCRIPTION

The present invention provides a fluoroelastomer composition. This includes a fluoropolymer comprising interpolymerized units derived from a nitrogen-containing cure site monomer, and an amino-substituted aromatic curative compound. The curative compound can generally be described as having at least one substituent other than hydrogen, and the net effect of the substituent(s) is not electron withdrawing, a pKa above about 12, the compound may contain one or more heteroatom(s) provided that no heteroatom directly bonded to a hydrogen is in the position ortho to the amino group, and one or more substituents may together form a ring, which ring may be aromatic and may include one or more heteroatoms(s).

The chemical group descriptions used in this document are described below and are known in the field, and these descriptions are not intended to change accepted meanings. "Amino-substituted" means $NH_2$-substituted. "Alkyl" means a C1–C15 aliphatic hydrocarbon group that may be linear or branched, and in some embodiments C1 to about C10. "Branched" means that one or more lower alkyl groups such as methyl, ethyl, or propyl are attached to a linear alkyl chain. "Alkenyl" means a C2 to about C15 (more preferably C2 to about C10, and in other embodiments more preferably C2 to about C6) aliphatic hydrocarbon group containing a carbon-carbon double bond and which may be straight or branched. These groups also may be substituted by one or more halo atoms, cycloalkyl, or cycloalkenyl groups. "Aryl" means a C6 to about C12 aromatic carbocyclic radical containing. Exemplary aryl groups include phenyl or naphthyl optionally substituted with one or more aryl group substituents which may be the same or different, where "aryl group substituent" includes hydrogen, alkyl, cycloalkyl, optionally substituted aryl, optionally substituted heteroaryl, aralkyl, aralkenyl, aralkynyl, heteroaralkyl, heteroaralkenyl, heteroaralkynyl, hydroxyalkyl, alkoxy, aryloxy, aralkoxy, acyl, aroyl, halo, nitro, cyano, alkoxycarbonyl, aryloxycarbonyl, aralkoxycarbonyl, acylamino, aroylamino, and other known groups. "Hetero" means oxygen, nitrogen, or sulfur in place of one or more carbon atoms.

Combinations of these groups are also useful. For example, "cycloalkyl" means a C3 to about C12 non-aromatic mono- or multicyclic ring system. Exemplary cycloalkyl rings include cyclopentyl, cyclohexyl, and cycloheptyl. "Cycloalkenyl" means a C3 to about C10 non-aromatic monocyclic or multicyclic ring system containing a carbon-carbon double bond. "Alkaryl" means an aryl-alkyl- group in which the aryl and alkyl are as previously described. "Alkenylaryl" means an aryl-alkenyl- group in which the aryl and alkenyl are as previously described. These groups also may be substituted by one or more halo atoms, or methylene, alkyl, cycloalkyl, heterocyclyl, aralkyl, heteroaralkyl, aryl, or heteroaryl groups.

Fluoroelastomers useful in the present invention are derived from one or more fluorinated monomer(s) and optionally one or more non-fluorinated comonomer(s), along with interpolymerized units derived from a nitrile-containing cure site monomer.

The fluoroelastomer compositions of the invention are derived from interpolymerized units of fluorinated monomers such as those having the formula $CF_2{=}CX{-}R_f$, wherein X is H, F, $CF_3$, or $CH_3$, $R_f$ is fluorine or a $C_1$–$C_8$ fluoroalkyl. Optional comonomers include hydrogen-containing $C_2$–$C_9$ olefins, which have less than half of the hydrogen atoms substituted with fluorine, more preferably less than one-fourth of the hydrogen atoms substituted with fluorine, and which are non-fluorinated in other embodiments. Suitable examples of fluorinated monomers include tetrafluoroethylene, hexafluoropropylene, and chlorotrifluoroethylene.

Hydrogen-containing olefins useful in the invention include those of the formula $CX_2{=}CX{-}R$, wherein each X is, independently, hydrogen or fluorine or chlorine, R is hydrogen, fluorine, or a $C_1$–$C_{12}$, preferably $C_1$–$C_3$, alkyl. Preferred olefins include partially-fluorinated monomers (e.g., vinylidene fluoride) or hydrogen-containing monomers such as olefins including α-olefins (e.g., ethylene, propylene, butene, pentene, hexene, and the like). Combinations of the above-mentioned materials are also useful.

When the fluoroelastomer is not perfluorinated, it contains from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether. Perfluoroelastomers also are useful in the present invention. These materials Perfluorinated vinyl ethers also are suitable as comonomers in the present invention. Such perfluorovinylethers include, for example, $CF_2{=}CFOCF_3$, $CF_2{=}CFOCF_2CF_2OCF_3$, $CF_2{=}CFOCF_2CF_2CF_2OCF_3$, $CF_2{=}CFOCF_2CF_2CF_3$, $CF_2{=}CFOCF_2CF(CF_3)OCF_2CF_2CF_3$, and $CF_2{=}CFOCF_2CF(CF_3)OCF_2CF(CF_3)OCF_2CF_2CF_3$.

One example of a useful fluoroelastomer is composed of principal monomer units of tetrafluoroethylene and at least one perfluoroalkyl vinyl ether. In such copolymers, the copolymerized perfluorinated ether units constitute from about 1 to about 60 mol % (more preferably 10 to 40 mol %) of total monomer units present in the polymer.

The cure site component is involved in curing the fluoroelastomers of the invention. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, and amidine groups. Some preferred cure site monomers in the fluoroelastomer of the invention include nitrile-containing cure site monomers. These include nitrile-containing fluorinated olefins and nitrile-containing fluorinated vinyl ethers, such as: $CF_2{=}CFO(CF_2)_LCN$;

$$CF_2{=}CFO[CF_2CF(CF_3)O]_q(CF_2O)_yCF(CF_3)CN;$$

$CF_2{=}CF[OCF_2CF(CF_3)]_rO(CF_2)_tCN$; and $CF_2{=}CFO(CF_2)_uOCF(CF_3)CN$, wherein L=2–12; q=0–4; r=1–2; y=0–6; t=1–4; and u=2–6. Representative examples of such monomers include $CF_2{=}CFO(CF_2)_3OCF(CF_3)CN$, perfluoro(8-cyano-5-methyl-3,6-dioxa-1-octene), and $CF_2{=}CFO(CF_2)_5CN$.

An effective amount of cure site monomer is used in the fluoroelastomer to achieve the desired results. For example, this amount is increased to increase crosslink density of a cured article. The amount of cure site monomer in the fluoroelastomer preferably ranges from at least about 0.001 mol %, more preferably at least about 0.01 mol %. The amount of cure site monomer in the fluoroelastomer preferably ranges from below about 5 mol %, more preferably below about 3 mol %.

The fluoroelastomers may be prepared by methods known in the art. For example, the polymerization process can be carried out by free-radical polymerization of the monomers alone or as solutions, emulsions, or dispersions in an organic solvent or water. Polymerization in an aqueous emulsion or suspension often is preferred because of the rapid and nearly complete conversion of monomers, easy removal of the heat of polymerization, and ready isolation of the polymer. Emulsion or suspension polymerization typically involves polymerizing monomers in an aqueous medium in the presence of an inorganic free-radical initiator system, such as ammonium persulfate (APS) or potassium permanganate, and a surfactant or suspending agent.

Aqueous emulsion polymerization can be carried out continuously under steady-state conditions in which, for example, monomers, water, surfactants, buffers, and catalysts are fed continuously to a stirred reactor under optimum pressure and temperature conditions while the resulting emulsion or suspension is removed continuously. See, e.g., U.S. Pat. No. 5,789,489. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The free-radical polymerization process can also be carried out in the presence of a perfluorosulfinate and an oxidizing agent to improve the processability of the resulting fluoropolymer composition. Such oxidizing agents are water soluble and capable of converting the sulfinate to a sulfonyl moiety. The produced sulfonyl radical is believed to eliminate $SO_2$ and form a fluorinated radical that initiates the polymerization of the ethylenically unsaturated monomers. A number of useful oxidizing agents are known as taught in U.S. Pat. Nos. 5,285,002 and 5,639,837. Representative examples of such useful oxidizing agents are sodium, potassium, and ammonium persulfates, perphosphates, perborates, percarbonates, bromates, chlorates, and hypochlorites. Other useful oxidizing agents include Cerium compounds such as $(NH_4)_2Ce(NO_3)_6$. The amount of oxidizing agent used can vary depending on the particular oxidizing agent and sulfinate employed. Typically an equimolar amount or less (based on the amount of sulfinate) is used. Perfluorosulfinates useful for this purpose include those described in U.S. Pat. Nos. 5,285,002 and 5,378,782.

Most commercially employed fluoropolymer curative systems involve nitriles, peroxides, dinucleophilics (e.g., bisphenols), and irradiation. Curative systems used with nitrile cure systems have included tetraphenyltin, ammonium, and ammonia generating compounds, as well as nitrogen containing nucleophilic compounds such as bis(aminophenols), bis(aminothiophenols), heterocyclic secondary amines, and guanidines, among others.

This invention uses curative systems based on amino-substituted aromatic compounds having at least one substituent other than hydrogen. The substituent may or may not be aromatic. These compounds may also be part of a dual curative system. It is preferred to use compounds where the amine nitrogen is electron dense. These electron dense amino substituted aromatic compounds surprisingly improve heat aging properties such as elongation at break.

Thus it is preferable to not include electron withdrawing groups on the aromatic moiety or, if multiple substituents are included it is preferable to have an overall non-electron withdrawing effect on the amine nitrogen. Electron donating substituents are preferred. The aromatic moiety of the amino substituted aromatic compound may be selected from a number of materials including but not limited to benzenes, napthalenes, anthracenes, pyridines, pyrimidines, melamines, quinolines, furans, pyroles, oxazoles, iridazoles, thiophenes, triazines, azulenes, benzimidazoles, and combinations thereof. Examples of aromatic compounds beyond benzene are identified below. Such exemplary compounds can be substituted or unsubstituted, R can be, for example, alkyl, alkenyl, cycloalkyl, aryl, or alkaryl, as described above.

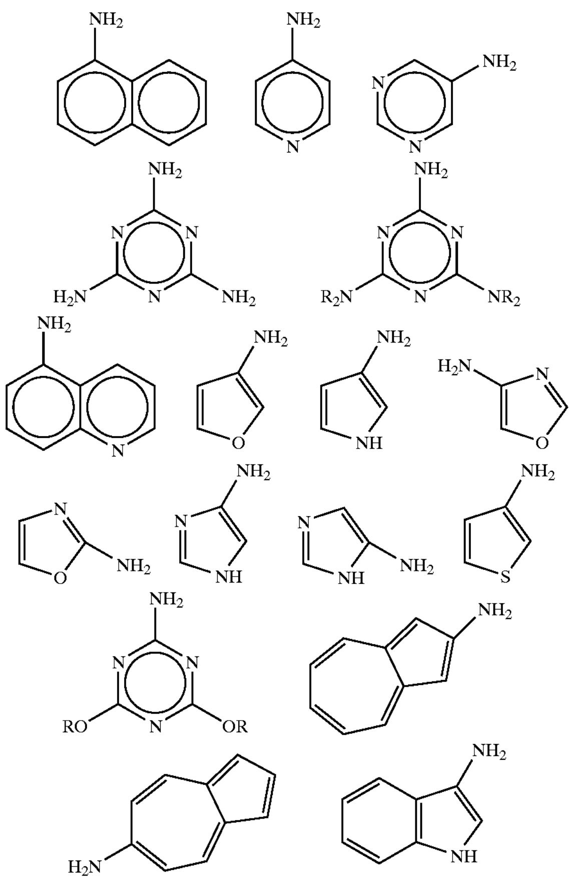

One way of characterizing electron withdrawing and donating effect on aromatics and pKa values can be found, for example, in "Advanced Organic Chemistry, Reactions, Mechanisms and Structures", J. March, 2nd ed., 1977, McGraw-Hill, Chapters 8 and 9. Substituents can affect reactivity of the amine nitrogen by way of electrical (field or resonance) effects. The net result of all these effects is that the electron density distribution is modified. For example, some groups considered to have an electron withdrawing effect may include $NO_2$, CN, and $NH_3$+ while groups considered to have a resonance electron donating effect may include $NH_2$, $NHCH_3$, $N(CH_3)_2$, OR, $O^-$ and $CH_3$. The Hammett equation, $\log (k/k_0)=\sigma\rho$ is an attempt to quantify the effects of substituent effects on aromatics. The $\sigma$ values are numbers that sum up the total electrical effects of a group when attached to a benzene ring in a meta or para position. The $\sigma_\rho$ effects are expected to have the most impact on the inventive curing agents. A positive value of $\sigma$ indicates an electron withdrawing group and a negative value an electron donating group. Values of $\sigma$ for the groups listed as electron withdrawing above are all greater than 0.5 while those listed as electron donating above are below zero. In some embodiments, it is preferred to have a sum of $\sigma$ value effects less than about 0.5, more preferably less than about 0.3, and even more preferably less than 0.

Besides having a sum of non-electron donating effects, it is also desired that the amino substituted aromatic compound curing agent not be acidic to the extent that this character undesirably inhibits cure. That is, more acidic character can be tolerated or even sought in applications where curing proceeds at the desired rates, while in other systems of the invention less acidic character is sought. It is preferred that the first pKa (in the event of multiple pKa values) of the curing agent be greater than about 12, to allow proper cure in most systems. For example, ArOH has a pKa (in water at 25° C.) of 8–11 while $ArO^-$ has a pKa of >37. Similarly, $ArCO_2H$ has a pKa of about 4 while $ArCH_3$ has a pKa of about 35. Generally, it is believed that the amino group will increase the pKa relative to the compound lacking the amino group, although the increase may be insignificant. In some cases the pKa increases less than 3 units.

In another embodiment, the curative compound contains a heteroatom directly bonded to an R group in the position ortho to the amino group. The R is an alkyl such as C1–C5 alkyls, aryl, arylalkyl, cycloalkyl, and the like, and the R group may contain a heteroatom.

In another aspect, the curative compound has a heteroatom of oxygen, sulfur, or nitrogen, in one or both position(s) ortho to the amino group. When the heteroatom is nitrogen, it is bonded to two R groups. In some embodiments, the R group is a C1–C5 alkyl and the heteroatom is oxygen.

Examples of useful curatives include methoxy-substituted mono- and bis-amino-substituted aromatic compounds, alkoxy-substituted mono- and bis- amino-substituted aromatic compounds, dialkyl amino-substituted mono- and bis-amino-substituted aromatic compounds, thioalkoxy-substituted mono- and bis- amino-substituted aromatic compounds, and combinations thereof.

More specific examples of useful curatives include o-anisidine, p-anisidinc, m-anisidine, 4",4'"-(hexafluoroisopropylidene)-bis(4-phenoxyaniline), 4-phenoxyaniline, 3,4,5-trimethoxyaniline, 2,2-bis(4-aminophenyl) hexafluoropropane, a 4-amino-2, 6-dichlorophenoxide salt, and combinations thereof.

Additives such as carbon black, stabilizers, plasticizers, lubricants, fillers including fluoropolymer fillers, and processing aids typically utilized in fluoropolymer compounding can be incorporated into the compositions. In some embodiments, additives that detrimentally affect the color of the composition are avoided.

Carbon black fillers can be used to balance properties such as modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When large size particle black is used, 1 to 70 parts filler per hundred parts fluoropolymer (phr) is generally sufficient.

One or more acid acceptors can also be added to the formulations. In some applications, where the presence of extractable metallic compounds is undesirable (e.g., semiconductor industry) the use of inorganic acid acceptors should be minimized or avoided. Commonly used acid acceptors include, for example, zinc oxide, calcium hydroxide, calcium carbonate, magnesium oxide, silicon dioxide (silica), etc. These compounds generally are used in the fluoropolymer formulation to bind any acids (such as HF) that might be generated at the high temperatures such as may be encountered during curing or at the temperatures where the fluoropolymers are intended to function.

The fluoroelastomer compositions can be prepared by mixing a selected fluoroelastomer gum with a selected catalyst, along with any selected additive(s) and/or adjuvant(s) (if any) in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. To avoid premature curing or "scorch," the temperature during mixing should not rise above the safe mixing temperature of the curative selected, e.g., mixing below about 120° C. During mixing, it is preferable to distribute the components uniformly throughout the gum.

The mixture is then processed and shaped, such as by extrusion (e.g., into the shape of a film, tube, or hose) or by molding (e.g., in the form of sheet or an O-ring). The shaped article can then be heated to cure the fluoropolymer composition and form a cured article.

Molding or press curing of the compounded mixture usually is conducted at a temperature sufficient to cure the mixture in a desired time duration under a suitable pressure. Generally, this is between about 95° C. and about 230° C., preferably between about 150° C. and about 205° C., for a period of from about I minute to 15 hours, typically from 5 minutes to 30 minutes. A pressure of between about 700 kPa and about 21,000 kPa is usually imposed on the compounded mixture in a mold. The molds first may be coated with a release agent and baked.

The molded mixture or press-cured article is then usually post-cured (e.g., in an oven) at a temperature and for a time sufficient to complete the curing, usually between about 150° C. and about 300° C., typically at about 230° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more. This post-cure step generally completes the cross-linking and may also release residual volatiles from the cured compositions. One example of a suitable post-cure cycle involves exposing molded parts to heat under nitrogen using six stages of conditions. First, the temperature is increased from 25 to 200° C. over 6 hours, then the parts are held at 200° C. for 16 hours, after which the temperature is increased from 200 to 250° C. over 2 hours. Then the parts are held at 250° C. for 8 hours, after which the temperature is increased from 250 to 300° C. over 2 hours. Then the parts are held at 300° C. for 16 hours. Finally, the parts are returned to ambient temperature such as by shutting off the oven heat.

The fluoropolymer compositions are useful in production of articles such as O-rings, gaskets, tubing, and seals, especially when a clean-appearing fluoroelastomer article is desired. The curable compositions formulated without inorganic acid acceptors are particularly well suited for applications such as seals and gaskets for manufacturing semiconductor devices, and in high-temperature automotive seals.

Objects and advantages of this invention are further illustrated by the following examples, wherein the particular materials and amounts recited, as well as other conditions and details, should not be construed to unduly limit this invention.

EXAMPLES

The materials used were available from Aldrich Chemical Co., Milwaukee, Wis., unless otherwise specified. The indicated results were obtained using the following test methods, unless otherwise noted. The test results appear in the table below.

Test Methods

Cure rheology: Tests were run on uncured, compounded samples using a Monsanto Moving Die Rheometer (MDR) Model 2000 in accordance with ASTM D 5289-93a at various times and temperatures and a 0.5 degree arc. Both the minimum torque ($M_L$) and highest torque attained during a specified period of time when no plateau or maximum torque was obtained ($M_H$) were measured. Also measured were the time for the torque to increase 2 in-1b (0.2 N m) above $M_L$ ("$t_s2$"), the time for the torque to reach a value equal to $M_L+0.5(M_H-M_L)$("t'50"), and the time for the torque to reach $M_L+0.9(M_H-M_L)$("t'90").

Press-Cure: Sample sheets measuring 150×150×2.0 mm, and O-rings were molded from the mixed uncured compounds using a heated press set at various times and temperatures as indicated in the examples.

Post-Cure: Press-cured sample sheets and O-rings were exposed to heat in air for various times and temperatures. The samples were returned to ambient temperature before testing.

Physical Properties: Tensile Strength at Break, Elongation at Break, and Modulus at 100% Elongation were determined using ASTM D 412-92 on samples cut from the press- and post-cured sheet with ASTM Die D.

Hardness: Samples were measured using ASTM D 2240-85 Method A with a Type A-2 Shore Durometer. Units are reported in points on the Shore A scale.

Compression Set: O-ring samples were measured using ASTM 395-89 Method B at various times, temperatures, and 25% original deflection (unless noted otherwise). The O-rings had a cross-sectional thickness of 0.139 in. (3.5 mm). Results are reported as a percentage of the original deflection.

Heat Aging: ASTM D573, with time and temperature indicated in the examples.

Examples 1–8

Perfluoroelastomer A was prepared by aqueous emulsion polymerization having interpolymerized units of 66.2 mole percent (mol %) tetrafluoroethylene (TFE), 33.0 mol % perfluoromethyl vinyl ether (PMVE) and 0.8 mol % of a nitrile-containing cure site monomer, $CF2{=}CFO(CF_2)_5CN$ (MV5CN).

Perfluoroelastomer B was similarly prepared and had interpolymerized units of 66.8 mol % TFE, 32.0 mol % PMVE and 1.2 mol % MV5CN.

The perfluoroelastomer was masticated on a two roll mill for 1 to 2 min. Optionally silica filler (Aerosil® R-972, from Degussa) was then added. This was followed by the addition of the amino-substituted aromatic curative compound. Optionally barium sulfate (No. 100 from Sakai Chemical, Osaka, Japan) and titanium dioxide (A-110 from Sakai Chemical, Osaka, Japan) or N990 carbon black were then added with a total mixing time of 15 to 20 min. Sample sheets and O-rings were prepared. The samples were then tested for cure rheology and press cured. Press and post curing conditions varied as follows: Examples 1–4 were press cured at 188° C. for 20 min. and postcured at 200° C. for 24 h. Example 5 was press cured at 177 C for 30 min. and post curing was ramped from room temperature to 200° C. over 6 h, then held at 200° C. for 16 h, then ramped to 200–250° C. in 2 h, then held at 250° C. for 8 h, then ramped to 250–300° C. for 2 h and finally held at 300° C. for 16 h before cooling to room temperature over 2 h. Example 6 was press cured at 177° C. for 30 min. and post cured at 250° C. for 16 h. Example 7 was not molded into finished parts; it was used to demonstrate that a curing a curing effect was present. This illustrated the effect of converting the phenol group in CE-1 into an electron donating phenoxide salt to provide the necessary curing effects. The molded sheets were used for the Die D dumbbells used in testing the physical properties (per ASTM D412) and the heat aging properties (per ASTM D573). The molded 3.59 mm O-rings were used for compression set testing per ASTM D395 Method B. The results are included in the tables below.

In the following table, Curative A is 4", 4'"-(hexafluoro isopropylidene) bis(4-phenoxyaniline), Curative B is 4-phenoxyaniline, Curative C is 3,4,5-trimethoxyaniline, Curative D is p-anisidine, Curative E is 2,2-bis(4-aminophenyl) hexafluoropropane (from Central Glass Co., Ltd., Saitama, Japan), and Curative F is 4-amino-2, 6-dichlorophenoxide sodium salt (prepared by reacting equimolar amounts of 4-amino-2, 6-dichlorophenol and $NaOCH_3$ in methanol at room temperature).

TABLE 1

| Formulations | | | | | | | |
|---|---|---|---|---|---|---|---|
| | Example | | | | | | |
| | 1 | 2 | 3 | 4 | 5 | 6 | 7 |
| Perfluoroelastomer A | | | | | | 100 | |
| Perfluoroelastomer B | 100 | 100 | 100 | 100 | 100 | | 100 |
| Curative A | 0.8 | | | | | | |
| Curative B | | 0.5 | | | | | |
| Curative C | | | 1.0 | | | | |
| Curative D | | | | 0.5 | 0.4 | | |
| Curative E | | | | | | 2.0 | |
| Curative F | | | | | | | 0.5 |
| Aerosil R-972 | 1.5 | 1.5 | 1.5 | 1.5 | | | 1.5 |
| N990 Black | | | | | 20 | 15 | |
| Titanium dioxide | 4 | 4 | 4 | 4 | | | 4 |
| Barium sulfate | 40 | 40 | 40 | 40 | | | 40 |

Comparative Examples CE-1 to CE-4

Perfluoroelastomer B was masticated on a two roll mill for 1 to 2 minutes. Aerosil R-972 was then added, followed by the addition of a curing agent with a total mixing time of 15 to 20 min. Sheets and O-rings were prepared and tested as in the examples above. None of the Comparative Examples cured, so they could not be molded into useful parts. Formulations and test results are included in the tables below.

TABLE 2

| CE Formulations | | | | |
|---|---|---|---|---|
| | Example | | | |
| | CE-1 | CE-2 | CE-3 | CE-4 |
| Perfluoroelastomer B | 100 | 100 | 100 | 100 |
| 4-amino-2,6-dichlorophenol | 0.5 | | | |
| Ethyl 2-aminobenzoate | | 0.6 | | |
| Ethyl 4-aminobenzoate | | | 0.6 | |
| 3,5-bis(trifluoromethyl)-aniline | | | | 1.3 |
| Aerosil R-972 | 1.5 | 1.5 | 1.5 | 1.5 |
| Titanium dioxide | | 4 | 4 | 4 |
| Barium sulfate | | 40 | 40 | 40 |

In the following tables, N/M indicates that the property was not measured, and N/C indicates that the material did not cure.

TABLE 3

| Cure Rheology | | | | | | | | | | | |
|---|---|---|---|---|---|---|---|---|---|---|---|
| | Example | | | | | | | | | | |
| | 1 | 2 | 3 | 4 | 5 | 6 | 7 | CE-1 | CE-2 | CE-3 | CE-4 |
| Temperature (° C.) | 188 | 188 | 188 | 188 | 177 | 177 | 177 | 177 | 177 | 177 | 177 |
| $M_L$ (N m) | 0.419 | 0.419 | 0.313 | 0.381 | 0.140 | 0.084 | 0.249 | N/C | N/C | N/C | N/C |
| $M_H$ (N m) | 0.938 | 0.776 | 0.803 | 0.858 | 0.585 | 0.581 | 0.390 | N/C | N/C | N/C | N/C |
| $t_s2$ (min) | 9.12 | 9.82 | 11.2 | 5.12 | 5.79 | 7.01 | — | N/C | N/C | N/C | N/C |
| t'50 (min) | 10.2 | 7.52 | 11.7 | 5.47 | 5.73 | 7.41 | 2.77 | N/C | N/C | N/C | N/C |
| t'90 (min) | 17.8 | 16.4 | 17.9 | 14.4 | 10.17 | 11 | 17.9 | N/C | N/C | N/C | N/C |

In the following table, N/M indicates that the property was not measured, TS means Tensile Strength at Break and EB means Elongation at Break.

TABLE 4

| Physical Properties | | | | | | |
|---|---|---|---|---|---|---|
| | Example | | | | | |
| | 1 | 2 | 3 | 4 | 5 | 6 |
| Press and Post Cured | | | | | | |
| TS (MPa) | 14.89 | 16.31 | 13.65 | 15.79 | 18.39 | 15.03 |
| EB (%) | 165 | 200 | 190 | 180 | 202 | 217 |
| 100% Modulus (MPa) | 10.48 | 8.27 | 7.58 | 9.45 | 5.05 | 4.14 |
| Hardness (Shore A) | 75 | 75 | 75 | 75 | 69 | 67 |
| Compression Set (%) | | | | | | |
| 96 h, 200° C. | N/M | N/M | N/M | N/M | N/M | 45.3 |

TABLE 4-continued

| Physical Properties | | | | | | |
|---|---|---|---|---|---|---|
| | Example | | | | | |
| | 1 | 2 | 3 | 4 | 5 | 6 |
| 96 h, 230° C. | N/M | N/M | N/M | N/M | N/M | 53.1 |
| 70 h, 230° C. | 47 | 59 | 70 | 58 | 22 | N/M |
| 70 h, 250° C., 15% initial defl. | 57 | 67 | 84 | 72 | N/M | N/M |
| 70 h, 316° C. | N/M | N/M | N/M | N/M | 38 | N/M |
| Heat Aged, 270° C., 70 h | | | | | | |
| TS (MPa) | 13.20 | 11.48 | 11.27 | 12.58 | N/M | N/M |
| EB (%) | 205 | 245 | 255 | 220 | N/M | N/M |
| Hardness (Shore A) | 73 | 72 | 71 | 73 | N/M | N/M |
| Heat Aged, 290° C., 70 h | | | | | | |
| TS (MPa) | 12.00 | N/M | 11.00 | 11.38 | 14.18 | 14.22 |
| EB (%) | 220 | N/M | 285 | 250 | 200 | 258 |
| 100% modulus (MPa) | N/M | N/M | N/M | N/M | 4.36 | 2.76 |
| Hardness (Shore A) | 73 | N/M | 74 | 73 | 66 | 65 |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

What is claimed is:

1. A composition comprising:

(a) a fluoropolymer comprising interpolymerized units derived from a nitrogen-containing cure site monomer; and (b) an aromatic curative compound having
 an $NH_2$ substituent and
 at least one additional substituent other than hydrogen, wherein the net effect of the additional substituent(s) is not electron withdrawing, the curative has a pKa above about 12, the compound may contain one or more heteroatom(s) provided that no heteroatom directly bonded to a hydrogen is in the position ortho to the $NH_2$ substituent, and one or more of the additional substituents may together form a ring, which ring may be aromatic and may include one or more heteroatom(s).

2. The composition according to claim 1 wherein the fluoropolymer comprises interpolymerized units derived from (i) tetrafluoroethylene, and (ii) a fluorinated comonomer, and optionally (iii) one or more perfluorovinyl ethers.

3. The composition of claim 1 wherein the fluoropolymer is perfluorinated.

4. The composition of claim 1 wherein the fluoropolymer comprises interpolymerized units derived from tetrafluoroethylene, and one or more perfluorovinyl ethers.

5. The composition of claim 1 wherein the nitrogen-containing cure site monomer is a nitrile cure site monomer.

6. The composition of claim 1 wherein the fluoropolymer is derived from interpolymerized units consisting essentially of one or more perfluorolefin(s), one or more perfluorovinylether(s), and a nitrile-containing cure site monomer.

7. The composition of claim 1 wherein the curative compound contains a heteroatom directly bonded to an R group in the position ortho to the $NH_2$ substituent, wherein R is an alkyl, alkenyl, aryl, or combination thereof, which may be cyclic, and which may contain a heteroatom.

8. The composition of claim 7 wherein the heteroatom is nitrogen, which is bonded to two R groups.

9. The composition of claim 7 wherein the R group is a C1–C5 alkyl and the heteroatom is oxygen.

10. The composition of claim 7 wherein the heteroatom is nitrogen, which nitrogen is bonded to two R groups, each R independently a C1–C5 alkyl.

11. The composition of claim 1 wherein the curative is selected from methoxy-substituted mono- and bis- amino-substituted aromatic compounds, alkoxy-substituted mono- and bis- amino-substituted aromatic compounds, dialkyl amino-substituted mono- and bis- amino-substituted aromatic compounds, thioalkoxy-substituted mono- and bis-amino-substituted aromatic compounds, and combinations thereof.

12. The composition of claim 1 wherein the curative is selected from amino-substituted napthalenes, amino-substituted anthracenes, amino-substituted pyridines, amino-substituted pyrimidines, amino-substituted melamines, amino-substituted quinolines, amino-substituted furans, amino-substituted pyrroles, amino-substituted oxazoles, amino-substituted imidazoles, amino-substituted thiophenes, amino-substituted triazines, amino-substituted azulenes, amino-substituted benzimidazoles, and combinations thereof.

13. The composition of claim 1 wherein the curative is selected from o-anisidine, p-anisidine, m-anisidine, 4",4'"-(hexafluoroisopropylidene)-bis(4-phenoxyaniline), 4-phenoxyaniline, 3,4,5-trimethoxyaniline, 2,2-bis(4-aminophenyl) hexafluoropropane, a 4-amino-2, 6-dichlorophenoxide salt, and combinations thereof.

14. The reaction product of parts (a) and (b) of claim 1.

15. An article comprising the composition of claim 1.

16. A method of making a fluoropolymer composition comprising:

(a) providing a fluoropolymer comprising interpolymerized units derived from a nitrile cure site monomer, (b) providing an aromatic curative compound having
 an $NH_2$ substituent and
 at least one additional substituent other than hydrogen, said additional substituent(s) not including a heteroatom that is directly bonded to a hydrogen and in the position ortho to the $NH_2$ substituent, wherein the net effect of the additional substituent(s) is not electron withdrawing, the curative has a pKa above about 12, the compound may contain one or more heteroatoms(s), and one or more of the additional substituents may together form a ring, which ring may be aromatic and may include one or more heteroatom(s); and (c) blending the fluoropolymer with the curative.

17. The method of claim 16 further comprising shaping the mixture; and curing the shaped mixture.

18. The method of claim 17 further comprising post-curing and optionally heat aging the cured mixture.

* * * * *

UNITED STATES PATENT AND TRADEMARK OFFICE

CERTIFICATE OF CORRECTION

PATENT NO. : 6,956,085 B2

DATED : October 18, 2005

INVENTOR(S) : Grootaert, Werner M. A.

It is certified that error appears in the above-identified patent and that said Letters Patent is hereby corrected as shown below:

<u>Column 5,</u>
Line 1, delete “iridazoles” and insert -- imidazoles --.

<u>Column 6,</u>
Line 32, delete “p-anisidinc” and insert -- p-anisidine --.

<u>Column 7,</u>
Line 19, delete “I” and insert -- 1 --.

<u>Column 12,</u>
Line 59, delete “,” and insert -- ; --.

Signed and Sealed this

Twenty-first Day of March, 2006

JON W. DUDAS

*Director of the United States Patent and Trademark Office*